US012717864B2

(12) United States Patent
Binkley et al.

(10) Patent No.: US 12,717,864 B2
(45) Date of Patent: Aug. 25, 2026

(54) APPROXIMATE MAXIMAL CLIQUE ENUMERATION FOR DYNAMIC GRAPHS

(71) Applicant: Raytheon Company, Arlington, VA (US)

(72) Inventors: Joshua A. Binkley, Richardson, TX (US); Thomas B. Swank, Plano, TX (US); Christine R. Nezda, Richardson, TX (US)

(73) Assignee: Raytheon Company, Arlington, VA (US)

( * ) Notice: Subject to any disclaimer, the term of this patent is extended or adjusted under 35 U.S.C. 154(b) by 1072 days.

(21) Appl. No.: 17/727,313

(22) Filed: Apr. 22, 2022

(65) Prior Publication Data

US 2023/0342420 A1 Oct. 26, 2023

(51) Int. Cl.
*G06F 17/11* (2006.01)

(52) U.S. Cl.
CPC .................................... *G06F 17/11* (2013.01)

(58) Field of Classification Search
CPC ....... G06F 17/11; G06F 16/9024; G06N 5/01; G06N 7/01; G06N 20/00; G06Q 50/01
See application file for complete search history.

(56) References Cited

U.S. PATENT DOCUMENTS

| | | | | |
|---|---|---|---|---|
| 2009/0315890 | A1* | 12/2009 | Modani | G06Q 10/10 345/440 |
| 2017/0288990 | A1* | 10/2017 | Atasu | G06F 16/9024 |
| 2020/0342028 | A1* | 10/2020 | Shukla | G06F 17/10 |

OTHER PUBLICATIONS

V. Stix in "Finding all maximal cliques in dynamic graphs" on Comput. Optim. Appl., 27(2):173-186, 2004. (Year: 2004).*

Conte, Alessio, et al., "Finding All Maximal Cliques in Very Large Social Networks", Proc. 19th International Conference on Extending Database Technology (EDBT), Bordeaux, France. DOI 10.5441/002/edbt.2016.18., (Mar. 2016), pp. 173-184.

Eppstein, David, et al., "Listing All Maximal Cliques in Sparse Graphs in Near-optimal Time", Retrieved Online. URL: <https://arxiv.org/abs/1006.5440>, (Jun. 2010), 13 pgs.

Pelillo, Marcello, "Heuristics for Maximum Clique and Independent Set", Encyclopedia of Optimization, Reference work entry, https://doi.org/10.1007/978-0-387-74759-0_264, (2008), pp. 1508-1520.

* cited by examiner

*Primary Examiner* — Carlo Waje
(74) *Attorney, Agent, or Firm* — Schwegman Lundberg & Woessner, P.A.

(57) ABSTRACT

Discussed herein are devices, systems, and methods for determining an approximation of a set of largest maximal cliques containing each node, entities represented by nodes and pairwise relation represented by edges. The method can include receiving dynamic graph data indicating the nodes and the edges of a dynamic graph, estimating, for one or more nodes of the nodes, cliques of size less than (or equal to) a user specified or default clique size parameter, storing the estimated cliques in a clique variable, identifying, for cliques of size greater than (or equal to) the clique size parameter, at most a single clique of a corresponding size, storing the identified single clique in the clique variable, and returning, for each node, the largest maximal cliques in the clique variable.

13 Claims, 4 Drawing Sheets

330 RECEIVE DYNAMIC GRAPH DATA INDICATING THE NODES AND THE EDGES OF A DYNAMIC GRAPH

332 ESTIMATE, FOR ONE OR MORE NODES OF THE NODES, CLIQUES OF SIZE LESS THAN (OR EQUAL TO) A USER SPECIFIED OR DEFAULT CLIQUE SIZE PARAMETER

334 STORE ESTIMATED CLIQUES IN CLIQUE VARIABLE

336 IDENTIFY, FOR CLIQUES OF SIZE GREATER THAN (OR EQUAL TO) THE CLIQUE SIZE PARAMETER, AT MOST A SINGLE CLIQUE OF A CORRESPONDING SIZE

338 STORE THE IDENTIFIED SINGLE CLIQUE IN THE CLIQUE VARIABLE

340 RETURN, FOR EACH NODE, THE LARGEST MAXIMAL CLIQUES IN THE CLIQUE VARIABLE

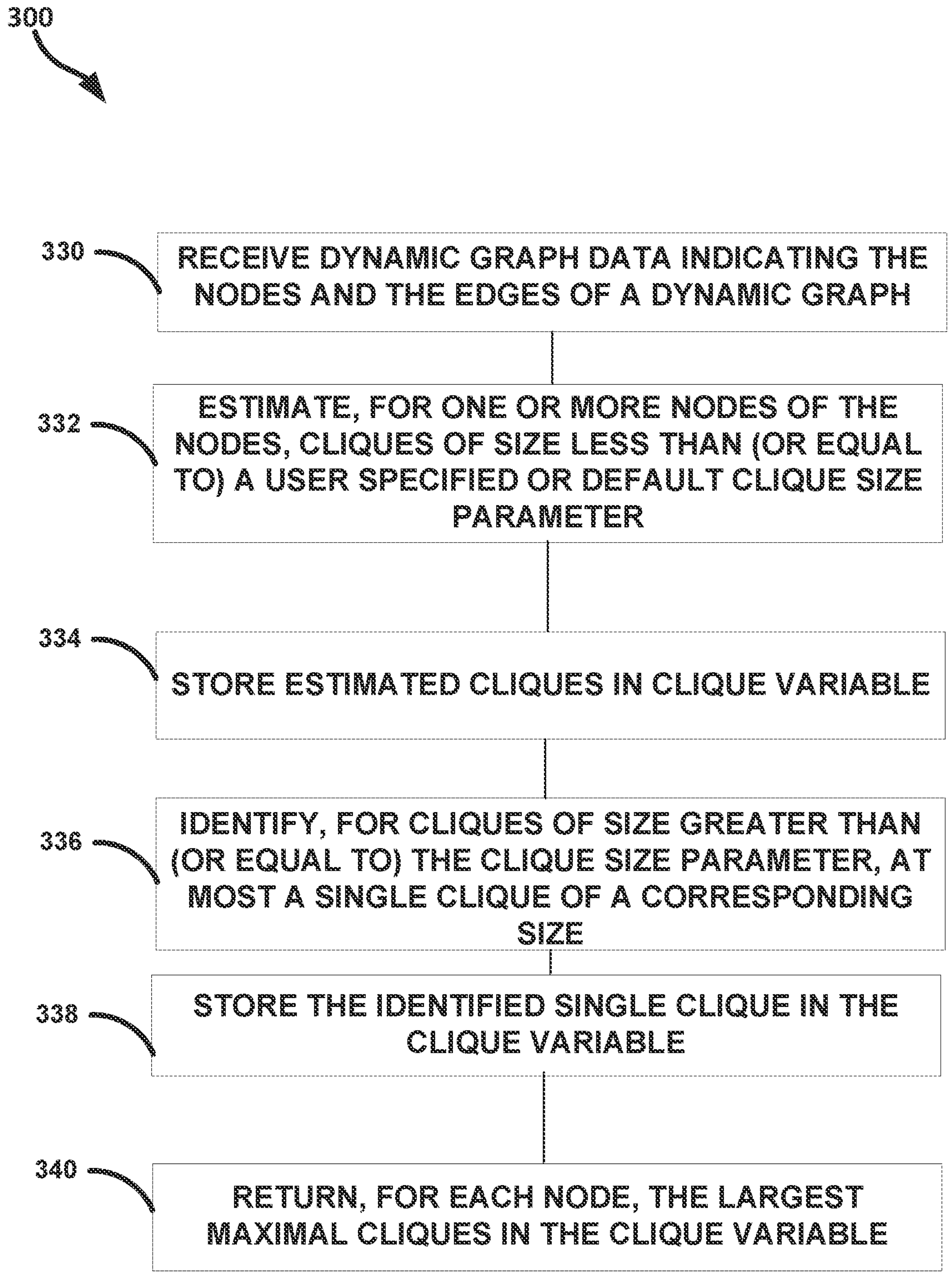

*FIG. 3*

APPROXIMATE MAXIMAL CLIQUE ENUMERATION FOR DYNAMIC GRAPHS

GOVERNMENT RIGHTS

This invention was made with United States government support under contract W15QKN-17-9-5555. The government has certain rights in the invention.

TECHNICAL FIELD

Embodiments generally regard a solution to approximate vertex-wise maximal clique enumeration (AVMCE).

BACKGROUND

NP-complete problems are a class of computational problems for which no efficient solution has been found. Maximal clique enumeration and clique cover on graphs is a classic NP-complete problem that is generally accepted to be intractable even on moderately sized graphs. A moderately sized graph has between 100 and 5000 nodes, clique sizes on the order of high tens to low hundreds, and an edge to vertex ratio between 50 and perhaps 150.

There is a significant amount of research on variations of the NP-complete problem. In particular, minimum vertex clique cover (MVCC) and minimum edge clique cover (MECC) have been studied for decades, and some approximations of solutions exist but do not address problems addressed by embodiments. Note that vertex and node are used interchangeably herein. There are also patents related to these solutions, for instance US Patent Publication 20090315890, titled "Method for Enumerating Cliques" (the "890 Application") describes enumerating cliques larger than a user-defined size.

The 890 Application uses the user-defined size to filter the graph and does not return anything at all if all maximal cliques are smaller than the user parameter. The 890 Application explains '[t]he techniques include obtaining data, wherein the data comprises a graph, obtaining a user-specified minimum size restriction on at least one maximal clique of interest, filtering the data using the user-specified minimum size restriction to reduce graph size, and enumerating at least one maximal clique from the graph provided that at least one maximal clique exists above the user-specified minimum size restriction . . . [t]he techniques described herein do not miss any maximal clique of size≥L'

BRIEF DESCRIPTION OF THE DRAWINGS

FIG. 3 illustrates, by way of example, a diagram of an embodiment of a method for unsupervised pattern discovery using dynamic graph embeddings.

DETAILED DESCRIPTION

Figure 1:
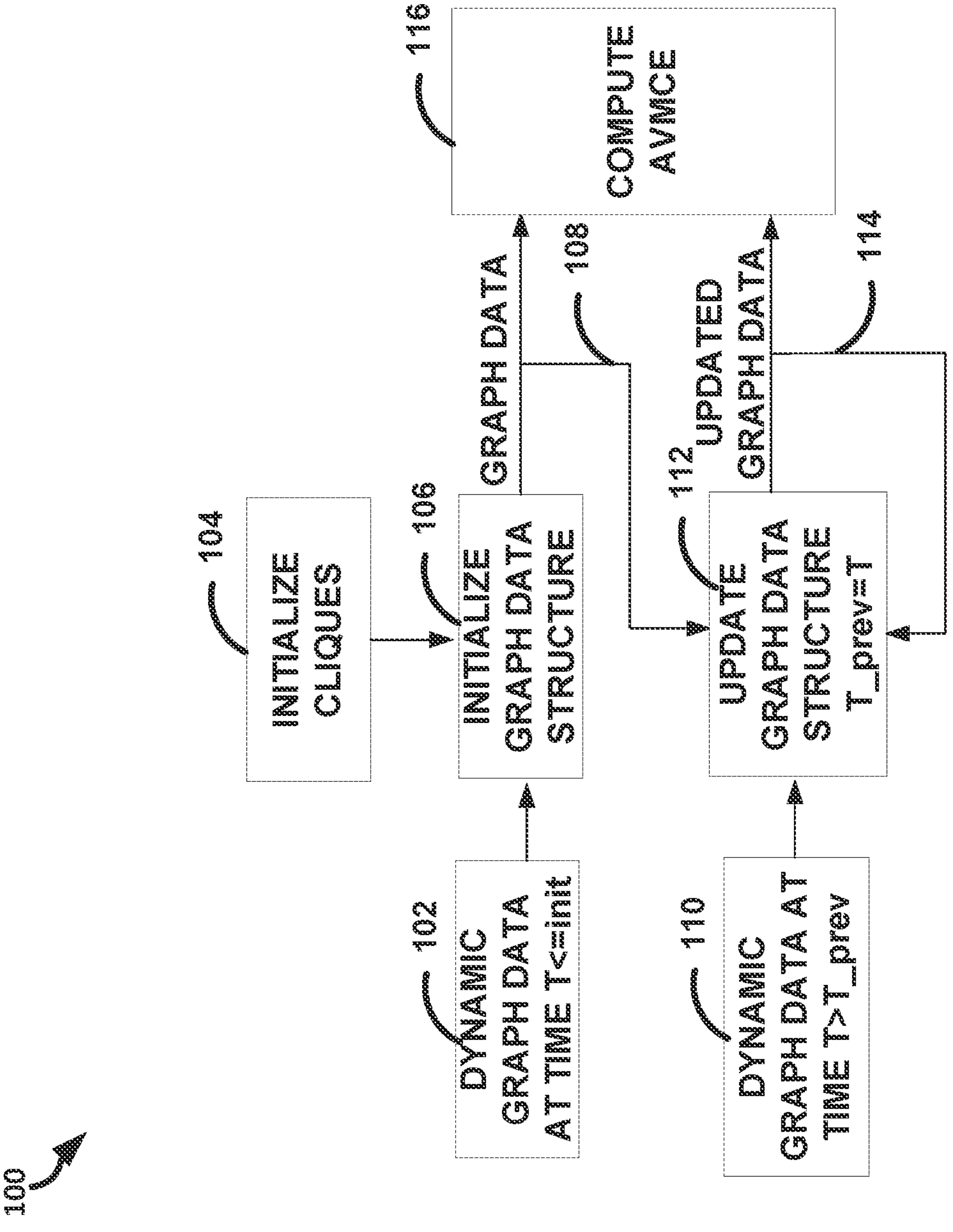
FIG. 1 illustrates, by way of example, a diagram of an embodiment of a method for AVMCE.

Applications of approximate vertex-wise maximal clique enumeration (AVMCE) are vast. Most data sets come with the additional difficulty of evolving through time, and have strict performance requirements, for instance, collusive behavior detection in high frequency trading, high-value target (HVT) confirmation from multiple intelligence sources, targeting of complex systems of equipment, drone swarming detection, and many others. New technology will help enable improved group detection in these kinds of contexts and many others. This is because existing solutions either rely on tangential approaches such as connected components and adjacency comparison, are not operable in real time, or approximate a solution that is not focused on locally maximal groups for each entity of interest.

In contrast to some prior techniques, the techniques of embodiments rely on not filtering the graph. Embodiments compute solutions for small cliques first and iterates on those to build towards maximal ones for each vertex. Also in contrast, embodiments do not require a provision that cliques above or below the user-provided size exist to enumerate cliques in the solution space. Embodiments use a different mechanic in that the user parameter is not a restriction on the possible sizes of cliques returned; only on the number of cliques returned of each size. Embodiments approximate, for each node, an enumeration of the largest maximal associated clique(s) of any size, and they do so in real time on dynamic graphs. Embodiments provide an approximation, whereas prior techniques are providing an exact solution given the stipulations above. Embodiments are basically targeting a performant approximation of all maximal cliques rather than an exact determination of only some (likely very large) maximal cliques.

Given a graph G (V, E), embodiments construct an approximate one-to-many mapping of vertexes, V, to C, where C is the set of maximal cliques in the graph, and v in V is mapped to c in C if v is a member of clique c and c is a largest clique of which v is a member. Specifically, embodiments construct a one-to-many mapping from V to S, where S approximates C, and for each vertex v in V, v will be mapped to 1 element, s in S, if there exists an s in S larger than M (a user-specified clique size) which contains v. Otherwise, it will be mapped for some x<=M to a subset N of S where n in N contains v and is of size x. The term vertex-wise is used to indicate the domain (V) of this mapping and its elements, in contrast to the domain (G) of a general or maximal clique enumeration.

Embodiments provide a problem formulation and solution that can be thought of first as a hybrid between an approximation to the MVCC and the MECC in which the solution set may have cliques with shared vertices, but also includes locally (vertex-wise) maximal cliques. Embodiments provide an approximate solution to the problem. Unlike a clique cover which is a mapping from vertices or edges to cliques, embodiments return a mapping from vertices to sets of cliques. Unlike a maximal clique enumeration, embodiments are not concerned about any clique in a clique enumeration that is not maximally large with respect to at least one vertex. For example, if a vertex v is a member of a large number of maximal cliques of size>M, embodiments will return at most one in association with v, and embodiments make no guarantees that they are processing cliques smaller than that size containing v whether or not those smaller cliques are maximal cliques as would be returned by a (non-vertex-wise) maximal clique enumeration algorithm.

For example, think of two triangles connected by a line segment. There are 3 maximal cliques that can be enumerated, but only two vertex-wise maximal cliques exist since the line segment represents a clique with a smaller size than the two triangles, and the two triangles collectively include all vertices. One can extend this visual indefinitely, for instance to 2 hexagonal cliques connected by a square clique—particularly when M is 2, the square clique, while maximal, is not the largest maximal clique with respect to any vertex in the graph. This is the conceptualization that makes it easiest to relate this problem to MVCC—what embodiments are doing, apart from mapping to sets rather than individual cliques, is very close to this in that as long as each vertex is mapped to something (in this case to some set of cliques), applications are satisfied without having mappings to all cliques, even all maximal cliques. In general, only the vertex-wise maximal cliques are of interest in application.

Embodiments can approximate a largest dense group with which each node in a graph is connected. Dense group (sometimes called a "complete subgraph" or "clique") means a group of nodes which are all connected to each other (there exists an edge between every pair of nodes in the group). A dense group which cannot be expanded by another node to form another dense group is known as a maximal clique. The approximation of the set of maximal cliques that contain some node is an output of embodiments. The terms "dense group" and "clique" are used interchangeably herein.

Embodiments are described with reference to pseudocode and an example to help aid in understanding. At a high level, embodiments operate based on updates to a data structure called "CLIQUES" defined as a variable to accommodate changes in the dynamic graph. The CLIQUES data structure organizes information about cliques in a graph, G. Embodiments can access and update the CLIQUES data structure at different levels. First, information pertaining to cliques that contain a particular node "n" as a member may be accessed as CLIQUES[n]. CLIQUES[n] stores ordered pairs (s, C) where s is a clique size and C is a set of cliques of size s which contain node n. The set of cliques containing a particular node, n, and also of a particular size, s, may be accessed using CLIQUES[n][s]. CLIQUES[n][s] stores an approximation of the set of cliques of size s which contain node n. As node adjacency is updated, such as by a change in the dynamic graph data, the CLIQUES data structure is also updated. After initialization of cliques and the graph data structure, an approximation of the set of locally maximal cliques for a vertex may be retrieved. Based on updates to the graph which are ingested, the output may also change to reflect changes to the cliques present in the graph after those updates.

To the extent possible, nomenclature is as follows:

Capitalized, non-italicized words represent variables available to multiple operations (e.g., ADJACENCY, CLIQUES, and M are shared by multiple operations)

Capitalized, italicized letters represent collections of primitives (e.g., V is a collection of vertices and C is a collection of cliques, etc.)

Lowercase, italicized letters represent primitives (e.g., integers, and for these purposes, nodes)

Superscript and subscript on a variable represent an association with another data structure or variable (e.g., $C_n^s$ is the set of cliques (C) of a particular sizes containing a particular neighbor, n, of some node v). In the case of time, it is purely for clarity.

Greek letters are restricted to omega, for which Ω represents an expanded clique, and ω represents a member of that clique.

A colon followed by equals ":=" indicates assignment.

Other symbols are common to set theory, type theory (colon, righthand arrow), and predicate logic.

FIG. 1 illustrates, by way of example, a diagram of an embodiment of a method 100 for AVMCE determination. The method 100 as illustrated includes receiving dynamic graph data 102 at an initial time (e.g., T=init). The dynamic graph data 102 indicates nodes and edges between nodes at the time T=init. Edges are assumed undirected in embodiments. Thus, an edge between two nodes is assumed an edge between both nodes and not just an edge from one of the two nodes to another node of the two nodes.

The remaining operations are discussed with reference to some explanatory variables. These variables are:

ADJACENCY: node→set (node)

ADJACENCY is a structure to store updated adjacency in the dynamic graph. ADJACENCY stores a set of ordered (vertex, adjacent vertices) pairs, supporting assignment and retrieval calls such as ADJACENCY[v], which will return the set of vertices adjacent to v.

CLIQUES: node→(int→set(set(node)))

CLIQUES is a structure to store updated information about cliques in the graph.

M: int

M is a user or default clique size parameter which represents the largest size for which the method 100 will store multiple cliques with respect to each node in CLIQUES. Above this threshold, the method 100 will store at most one clique of each size for each node. For example, for all x>M following a clique expansion, the size of CLIQUES [v][x]<1.

At operation 104, CLIQUES can be initialized as CLIQUES [v][x]:=.

Operation 104 assigns a set of cliques to the CLIQUES data structure for a node v, for a clique size of 1. The set of cliques assigned contains a single element: a clique whose sole member is v. The operation 104 can form the 'base case' of CLIQUE for the purposes of the method 100.

At operation 106, a graph data structure can be initialized. The operation 106 can include initializing CLIQUES, ADJACENCY, and M. A pseudocode technique for performing the operation 106 is provided:

```
Initialize (G (V, E), m)
ADJACENCY:= {(v, w)|v ∈ V, w ⊂ V, ∀u ∈ w, {v, u} ∈ E}
CLIQUES:= { }
M:= m
for {v|(v, w)|v ∈ ADJACENCY}
  initializeClique(v)
for {v|(v, w)|v ∈ ADJACENCY}
  computeCliques(v)
```

The operation 106 can ingest a graph G (V, E), with a vertex set V, and an edge set E. The operations 106 also takes a user or default parameter m, as input. m represents the maximum clique size for which multiple cliques will be stored by the method 100 for each (vertex, size) combination. The ADJACENCY structure is parsed from the graph, and stored as a set of ordered pairs (v, w) where v is in the set of graph nodes V, w is a subset of V, and for every element u in w, there exists an edge {u, v} in E. The CLIQUES data structure is initialized to an empty structure before being populated later in the method 100. The user parameter, m, is stored as M for later use by the method 100. The cliques are initialized for every node in the graph, which may be accessed using the set of first elements in the set of ordered pairs stored in ADJACENCY (for example, if ADJACENCY is implemented as a map, the map keys may be used; if the number of nodes is known in advance, implementations may leverage that number and a corresponding (e.g., array-based) indexing scheme to optimize the call). At this point, a similar loop is executed which calls a computeCliques operation (part of operations 106 and 116) on each vertex. Pseudocode for computeCliques is provided:

```
computeCliques(v) is
N_v := ADJACENCY[v]
for n ∈ N_v:
  C_n := CLIQUES[n]
  S_n := sort_asc({s|(s, C) ∈ C_n})
  if max(S_n) > M:
    S_n := [max(S_n)]
  for s_C^n ∈ S_n:
    for C_n^s ∈ C_n[s_C^n]:
      if (v ∉ C_n^s) ∧ (C_n^s − N_v = ∅):
        Ω := C_n^s ∪ {v}
        if s_C^n + 1 > M
          for ω ∈ Ω:
            CLIQUES[ω][s_C^n + 1] := {Ω}
        else :
          for ω ∈ Ω:
            CLIQUES[ω][s_C^n + 1] := CLIQUES[ω][s_C^n + 1] ∪ {Ω})
```

computeCliques takes a single node as input and processes the stored ADJACENCY and CLIQUES data structures to produce an approximation of a set of maximal cliques involving that node. The set of maximal cliques can be stored in CLIQUES for later use by the method 100. computeCliques retrieves the set of nodes adjacent to v, $N_v$ for later use. computeCliques iterates through those nodes, wherein data about the set of cliques for a particular node n adjacent to v is stored as $C_n$. As discussed elsewhere, this is a set of ordered pairs whose first element is a size and whose second element is a list of cliques of that size which contain node n. The sizes returned are sorted in ascending order (this is helpful if the implementation does not already maintain a sorted order on these sizes) and assigned to the variable $S_n$ (the set of sizes of cliques for node n) for sequential processing. It is determined whether the maximal size in $S_n$ is larger than the user parameter M. If it is, $S_n$ is overwritten with a list containing only that maximal size. The set of all cliques that both contain node ii and whose size is in the set $S_n$ are then retrieved. $S_n$ will have one element if that size is greater than M, and up to M elements otherwise.

$$C_n^s$$

represents one clique of size $$s_c^n -$$

it is an element of $$\text{CLIQUES}[n][s_c^n].$$

computeCliques defines a conjunction of two conditions regarding the clique $$C_n^s.$$

The first condition, $$(v \notin C_n^s),$$

is a determination on whether the node has already been processed as a member of the clique $$C_n^s$$

in a prior iteration. If the node has already been processed, there is no need to process it again. The second condition, $$(C_n^s - N_v = \emptyset),$$

is a determination about whether the expansion of clique $$C_n^s$$

by vertex v forms a clique. If the condition is false, it means that there is an element in $$C_n^s$$

which is not in the neighbors of v, which in turn implies that the union of {v} and $$C_n^s$$

does not constitute a clique. The union of $$C_n^s$$

and the set containing v, assigned to Ω, represents an expanded clique that is thought to be present in the graph. The conditions determine whether the expanded clique, Ω, is larger or smaller than the user threshold M. If it is larger, then for each node ω in that clique, an overwriting assignment will be made to CLIQUES[ω][expanded size]. The element assigned will be the set containing only the clique Ω, and in this way, the algorithm avoids the combinatorial explosion that would result by enumerating all distinct large cliques. Finally, if Ω has a number of members fewer than or equal to M, then for each member of Ω, ω, Ω will be added to CLIQUES at the list of cliques containing ω, and of size $$s_c^n + 1.$$

It should be noted that at the update points to CLIQUES, subsequent or preceding logic to output cliques may be added as these are the points at which updated maximal clique approximations are available for retrieval (they may also be retrieved for some or all vertices after updates have been completed).

Operations 104 and 106 produce data structures that can be used to generate graph data 108 that indicates the nodes, edges, and cliques for each vertex. The graph data 108 indicates all cliques of size up to in for which the node is a member and for each clique of size greater than m, at most a single clique is recorded per node. Since the graphs of embodiments are dynamic and thus subject to change, an operation to efficiently update the graph data 108 is helpful.

In the method 100, further dynamic graph data 110 can received. The dynamic graph data 110 includes data indicating one or more added edges, one or more added nodes, one or more removed edges, one or more removed nodes, or a combination thereof. The adding and removal are relative to the graph represented by the graph data 108. The dynamic graph data 110 indicates changes to the graph after time T=init, and after any prior calls to operation 112.

An update operation 112 can be performed based on the dynamic graph data 110. The update operation 112 retrieves a node and a set of neighbors at an immediately previous time and performs an update to cliques that reflects changes indicated by the dynamic graph data 110. Pseudocode for the operation 112 is provided:

```
Update (v, N_v^T) is

N_v^{T_prev} := ADJACENCY[v]

D := N_v^{T_prev} − N_v^T

A := N_v^T − N_v^{T_prev}

for n ∈ N_v^T ⋃ {v}:

   initializeClique(n)
for n ∈ D
   for (a, b) ∈ {(n, v), (v, n)}:
      R:= { }
         for (s, C) ∈ CLIQUES[a]:
            R[s] := R[s] ∪ {c|c ∈ C ∧ b ∈ c}
         for (s, C) ∈ R:
            for c ∈ C:
               if M > s − 1:
                  CLIQUES[a][s − 1] := {c − {b}}
               else:
                  CLIQUES[a][s − 1] :=
CLIQUES[a][s − 1] ∪ {c − {b}}
               for m ∈ c:
                  CLIQUES[m][s] := CLIQUES[m][s] − {c}
   ADJACENCY[n] := ADJACENCY[n] − [v]
ADJACENCY[v] := N_v^T
for n ∈ A:
   ADJACENCY[n] := ADJACENCY[n] ∪ {v}
computeCliques(v)
```

The operation 112 processes updates to the graph data 108 at a point in time, T>T_prev. The operation 112 takes a node v, and the set of neighbors at time T, $$N_v^T.$$

The adjacency at the prior timestep is retrieved as $$N_v^{T\_prev}$$

at operation 112. Two sets are computed, the first (D) representing nodes whose edges to v were removed between times T_prev and T, and the second (A) representing nodes which have edges to v that were added between times $T_{prev}$ and T. For the nodes which may not have been seen before, which include new nodes in A, and the node v, the CLIQUES can be initialized into data structure for further processing on those nodes. An iteration over nodes with removed edges to v, D can be performed. Updates to the CLIQUE data structure accounting for the removed edge between v and n can be performed. An iteration over pairs of nodes (a, b) where (a, b) are (n, v) in one iteration, and (v, n) in the other—the enclosed loop serves to remove cliques with edges between n and v, and to add member subsets of those cliques to CLIQUES. A set R can be defined which will be populated with cliques that contain both a and b, indexed by size. The iterations access those cliques for the purposes of adding sub-cliques of cliques in R containing all members except b to the CLIQUES[a] data structure, and to ensure that prior cliques containing edges between n to v are removed from CLIQUES data structure for all members of those cliques. The operations 112 updates the ADJACENCY structure for each node n in D to remove v. The operation 112 updates the ADJACENCY structure for the input node v, assigning it to the provided adjacency, $$N_v^T.$$

The operation 112 updates the ADJACENCY structure for nodes in A to add new edges to v. computeCliques is called on vertex v at the end of the operation 112.

A compute AVMCE operation 116 can be performed based on the graph data 108 or the updated graph data 114. The compute AVMCE operation 116 can return all cliques of size less than (or equal to) M and for each size greater than (or equal to) M the AVMCE operation 116 can return at most a single clique per node (if there are any cliques of that size). By reducing the number of cliques of size greater than NI to at most one per node, the AVMCE operation avoids the computational bulk of the NP-complete problem to produce solutions in real time or near real time. The operation 116 can return an estimation of a vertex-wise maximal clique set for all nodes on the order of seconds, and even microseconds depending on the size of the graph.

Pseudocode of the AVMCE operation 116 is provided:

```
getEstimatedMaximalCliques (v) is
s_max := max ({s|(s, C) ∈ CLIQUES[v]})
return CLIQUES [v][s_max]
```

The AVMCE operation 116 returns an estimate of the largest maximal cliques in which each node is a member. This is because of how the operations 106 and 112 populate the CLIQUE variable. The CLIQUE variable is populated to include, generally, at most one clique of each size greater than (or equal to) M. The cliques returned from operation 116 is thus an estimate of the largest maximal cliques for each node but is more computationally tractable than an exact solution.

Figure 2:
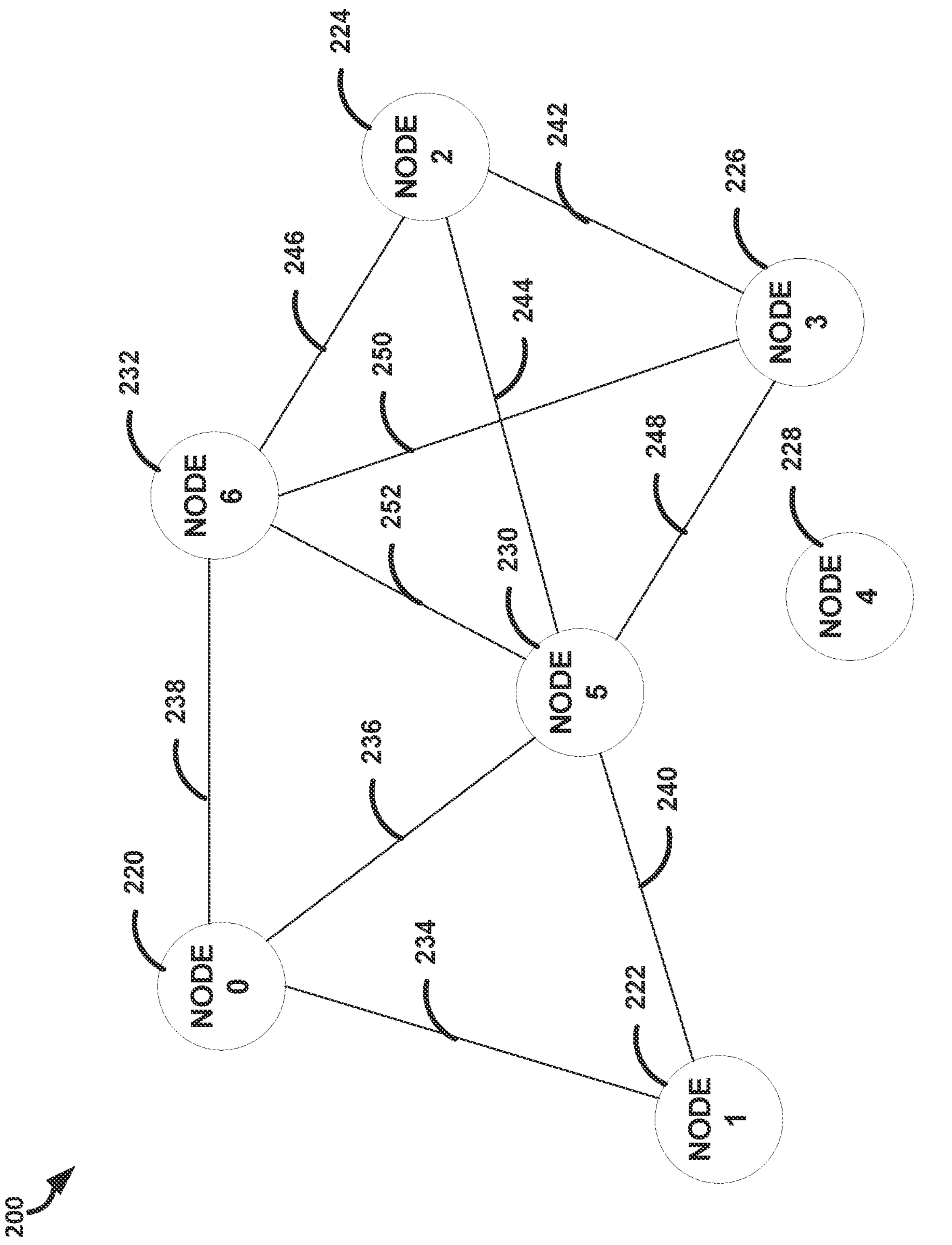
FIG. 2 illustrates, by way of example, a diagram of an embodiment of a dynamic graph at a snapshot in time.

FIG. 2 illustrates, by way of example, a diagram of an embodiment of a dynamic graph 200 at a snapshot in time. The graph 200 includes nodes 220, 222, 224, 226, 228, 230, 232. Some nodes 220, 222, 224, 226, 228, 230, 232 are related by edges 234, 236, 238, 240, 242, 244, 246, 248, 250, 252. For the graph 200, the variable ADJACENCY can be populated in accord with operations 106 and 116. The variable ADJACENCY, consistent with the operations 106 and 116, is provided in Table 1:

TABLE 1

ADJACENCY variable entries corresponding to the graph 200 of FIG. 2.

| NODE | NEIGHBORS |
|---|---|
| 0 | {1, 5, 6} |
| 1 | {0, 5} |
| 2 | {3, 5, 6} |
| 3 | {2, 5, 6} |
| 4 | { } |
| 5 | {0, 1, 2, 3, 6} |
| 6 | {0, 2, 3, 5} |

For the graph 200, the variable CLIQUES can be populated with operations 106 and 116. Table 2 provides the variable CLIQUES consistent with the graph 200 in FIG. 2:

TABLE 2

CLIQUE variable entries corresponding to the graph 200 of FIG. 2.

| NODE | CLIQUE SIZE | NODES IN CLIQUE |
|---|---|---|
| 0 | 1 | [{0}] |
| | 2 | [{0, 1}, {0, 6}, {0, 5}] |
| | 3 | [{0, 5, 6}, {0, 1, 5}] |
| 1 | 1 | [{1}] |
| | 2 | [{0, 1}, {1, 5}] |
| | 3 | [{0, 1, 5}] |
| 2 | 1 | [{2}] |
| | 2 | [{2, 5}, {2, 3}, {2, 6}] |
| | 3 | [{2, 3, 5}, {2, 3, 6}, {2, 5, 6}] |
| | 4 | [{2, 3, 5, 6}] |
| 3 | 1 | [{3}] |
| | 2 | [{3, 6}, {2, 3}, {3, 5}] |
| | 3 | [{2, 3, 5}, {2, 3, 6}] |
| | 4 | [{2, 3, 5, 6}] |
| 4 | 1 | [{4}] |
| 5 | 1 | [{5}] |
| | 2 | [{1, 5}, {3, 5}, {2, 5}, {0, 5}] |
| | 3 | [{2, 3, 5}, {0, 1, 5}, {0, 5, 6}, {2, 5, 6}] |
| | 4 | [{2, 3, 5, 6}] |
| 6 | 1 | [{6}] |
| | 2 | [{3, 6}, {0, 6}, {2, 6}] |
| | 3 | [{2, 3, 6}, {0, 5, 6}, {2, 5, 6}] |
| | 4 | [{2, 3, 5, 6}] |

Note that there is a sole clique of size 1 for node 4 228. This is because there are no edges connected to node 4 228. Although M=3, the clique of size 4 is correctly assigned to all 4 nodes, the same clique of size 4 is assigned to each node in the clique per operations 106 and 116. In this case the nodes in the clique of size of four are nodes 224, 226, 230, 232. Many of the nodes have several cliques of size<4. Node 0 220 has 2 maximal cliques stored in CLIQUES. M, in the example of FIG. 2 is set to 3, but that doesn't mean that ALL cliques of size<=3 are stored in CLIQUES. This is because of the operation 116.

For instance, for the node 230, the sub-clique {3,5,6} is missing from CLIQUES. This is because when the node 230 was processed as a neighbor of the node 232, the node 230 already had a clique larger than M {2,3,5,6}, precluding expansion of {3,5} to {3,5,6} per the operation 116.

Consider what happens when the node 230 no longer has a maximal clique of size 4. If the node 224 is removed, {3,5,6} becomes a maximal clique for the node 230, the update operation 116 will add clique {3,5,6} so that if the node 230 is queried for maximal cliques after the node 224 is removed, {3,5,6} will be returned. As another example, consider the same graph 200 without node 224 being present in the first place. In this case, there will not be a clique at size>M and therefore {3,5,6} will be added to the CLIQUES data structure.

An example illustrates the objective of the algorithm not to approximate the set of all cliques but to approximate maximal cliques. Assume that nodes are ingested in ascending numeric order. Then, the clique {2, 3, 5, 6} was added to the cliques for all of its members in computeCliques for the node 230 when it was looking at neighbor node 224. At that point, clique {2, 3, 6} was added to CLIQUES[2][3] (during the loop v=3, n=2), so when v=5 was being processed and it was determined that clique expansion was valid, {2, 3, 5, 6} was added to the node 230 as well as to nodes 224, 226, 232. After this, when the loop iteration for the node 232 proceeds to neighbor nodes 226, 230 (for which {3, 5, 6} is also missing), there was a maximal clique of size>M for each of them and therefore the clique {3, 5, 6} was not added as an expansion to any existing sub-clique—all three nodes had already been assigned a clique of size four (4) and therefore computations in these iterations focused on expanding only that clique (computeCliques). In the case of v=6, n=5 (as well as n=2, n=3), the clique that was considered was {2, 3, 5, 6}, which could not be expanded by the node 232 since it was an element of the clique under consideration (see computeCliques). In a case in which there are multiple cliques of size greater than M, the clique that is most recently processed will be stored in CLIQUES.

FIG. 3 illustrates, by way of example, a diagram of an embodiment of a method 300 for approximating a set of largest maximal cliques connected to each node. The method 300 as illustrated includes receiving dynamic graph data indicating the nodes and the edges of a dynamic graph, at operation 330; estimating, for one or more nodes of the nodes, cliques of size less than (or equal to) a user specified or default clique size parameter, at operation 332; storing the estimated cliques in a clique variable, at operation 334; identifying, for cliques of size greater than (or equal to) the clique size parameter, at most a single clique of a corresponding size, at operation 336; storing the identified single clique in the clique variable, at operation 338; and returning, for each node, the largest maximal cliques in the clique variable, at operation 340.

The method 300 can include, wherein each of the cliques includes nodes that each include an edge therebetween. The method 300 can include, wherein storing the estimated cliques in the clique variable includes storing, for each node in the clique, the clique, in the clique variable, of the node. The method 300 can include, wherein the clique variable is indexed by node. The method 300 can include, wherein the clique variable is sub-indexed by clique size and includes entries indicating nodes in the clique for each clique size associated with the node.

The method 300 can include initializing an adjacency variable based on the dynamic graph data. The method 300 can include, wherein the adjacency variable is indexed by node and includes entries, for each node, indicating which other nodes of the nodes are directly connected to the node by an edge. The method 300 can include, wherein the dynamic graph data indicates updates, additions, or deletions to the nodes and edges of the dynamic graph.

Example applications of embodiments are vast. For instance, in social media, AVMCE on a graph of user interactions would reveal likely groups of friends, demographically similar users, and so on. In graphs of physical movers, for example people or ships, AVMCE on a graph of these movers with edges between nearby movers would reveal for example fleets of ships, meetings of individuals, groups of soldiers in formation, pieces of equipment related to a common unit, and so on. One example application is finance. Clique detection has applications to the detection of Collusive Trading in markets (e.g., wherein graph nodes are traders and edges are constructed to represent potentially coordinated trading activities). Another example application is biology/molecular sciences. Clique detection facilitates the integration of genome mapping data, provides nonoverlapping local alignments between sequences in the evaluation of gene sequence pairs, and matching and comparative modeling of 3D molecular structures for example to assess whether a newly designed drug can bind to a protein to achieve a particular effect. Another example application includes entity/location applications. From above—groups of soldiers in formation for the purposes of deriving course of action, identification of emerging communities such as enemy groups for the purposes of targeting. Social networks (e.g., in human resources), such as finding structure in corporate networks based on communication links. In larger social networks, for example those found in social media platform data, cliques may represent groups of mutual friends—here a node might represent an individual user of the platform and an edge might represent acquaintance or some level of social media activity between users.

Figure 4:
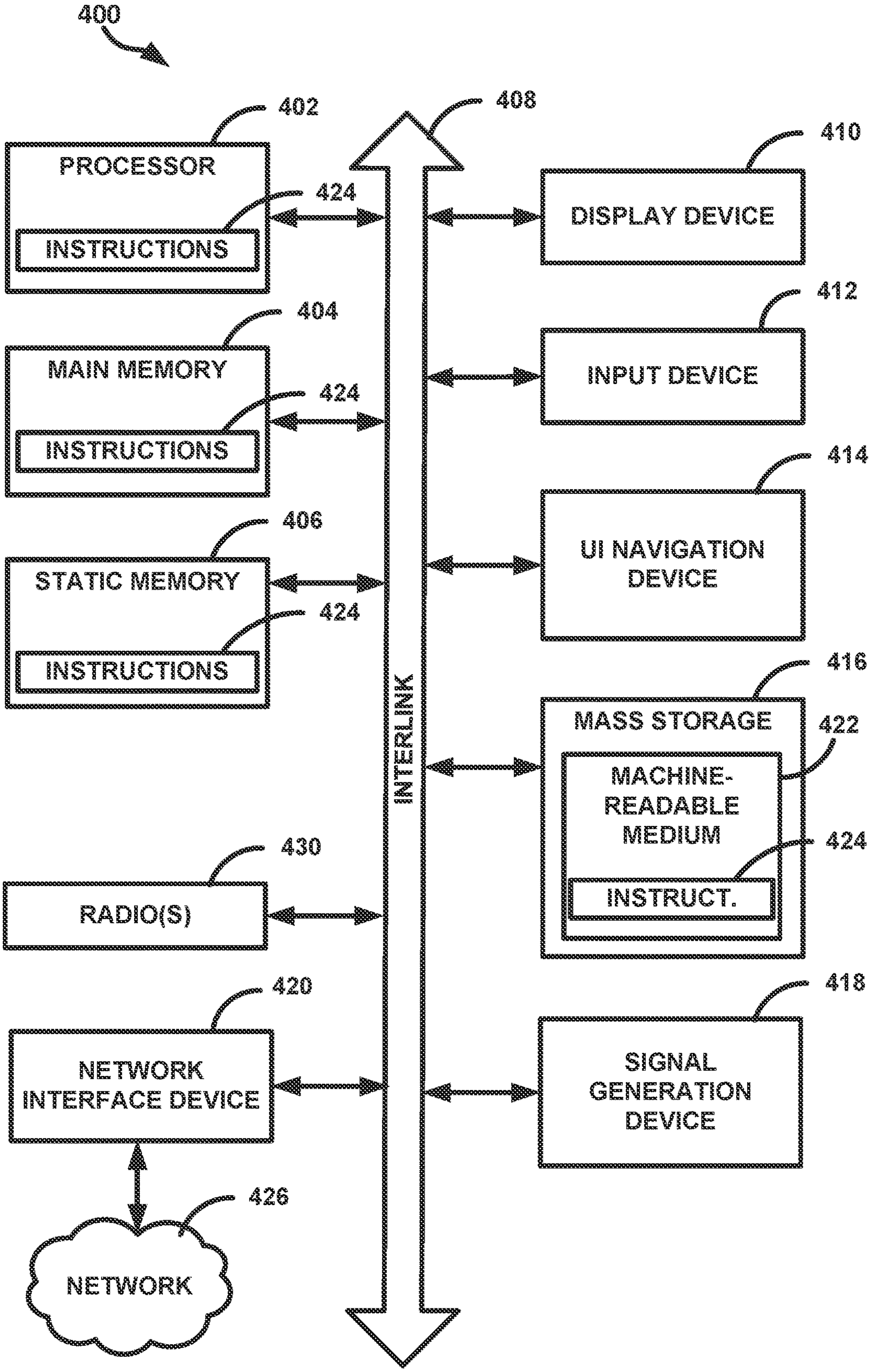
FIG. 4 illustrates, by way of example, a block diagram of an embodiment of a machine in the example form of a computer system within which instructions, for causing the machine to perform any one or more of the methodologies discussed herein, may be executed.

FIG. 4 illustrates, by way of example, a block diagram of an embodiment of a machine in the example form of a computer system 400 within which instructions, for causing the machine to perform any one or more of the methodologies discussed herein, may be executed. One or more of the method 100, 200, or a component or operation thereof can be implemented using one or more components of the computer system 400. One or more of the methods 100, 300 or a component or operation thereof can include one or more components of the computer system 400. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a mass storage unit 416, a signal generation device 418 (e.g., a speaker), a network interface device 420, and a radio 430 such as Bluetooth, WWAN, WLAN, and NFC, permitting the application of security controls on such protocols.

The mass storage unit 416 includes a machine-readable medium 422 on which is stored one or more sets of instructions and data structures (e.g., software) 424 embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Additional Notes and Examples

Example 1 includes a device comprising processing circuitry, and a memory including instructions that, when executed by the processing circuitry, cause the processing circuitry to perform operations for determining an approximation of a set of largest maximal cliques connected to each node, entities represented by nodes and pairwise relation represented by edges, the operations comprising receiving dynamic graph data indicating the nodes and the edges of a dynamic graph, estimating, for one or more nodes of the nodes, cliques of size less than (or equal to) a user specified or default clique size parameter, storing the estimated cliques in a clique variable, identifying, for cliques of size greater than (or equal to) the clique size parameter, at most a single clique of a corresponding size, storing the identified single clique in the clique variable, and returning, for each node, the largest maximal cliques in the clique variable.

In Example 2, Example 1 further includes, wherein each of the cliques includes nodes that each include an edge therebetween.

In Example 3, at least one of Examples 1-2 further includes, wherein storing the estimated cliques in the clique variable includes storing, for each node in the clique, the clique, in the clique variable, of the node.

In Example 4, at least one of Examples 1-3 further includes, wherein the clique variable is indexed by node.

In Example 5, Example 4 further includes, wherein the clique variable is sub-indexed by clique size and includes entries indicating nodes in the clique for each clique size associated with the node.

In Example 6, at least one of Examples 1-5 further includes, wherein the operations further comprise initializing an adjacency variable based on the dynamic graph data.

In Example 7, Example 6 further includes, wherein the adjacency variable is indexed by node and includes entries, for each node, indicating which other nodes of the nodes are directly connected to the node by an edge.

In Example 8, at least one of Examples 1-7 further includes, wherein the dynamic graph data indicates updates, additions, or deletions to the nodes and edges of the dynamic graph.

Example 9 includes a computer-implemented method that performs the operations of one of Examples 1-8.

Example 10 includes a non-transitory machine-readable medium including instructions that, when executed by a machine, cause the machine to perform operations comprising the operations of one of Examples 1-8.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device comprising:

processing circuitry; and a memory including instructions that, when executed by the processing circuitry, cause the processing circuitry to perform operations for determining an approximation of a set of largest maximal cliques connected to each node, entities represented by nodes and pairwise relation represented by edges, the operations comprising:

initialize an adjacency variable indexed by node and includes entries, for each node, indicating which other nodes of the nodes are directly connected to the node by an edge;

initialize a clique variable indexed by node and sub-indexed by clique size, storing, for each node, cliques of which the node is a member;

receive dynamic graph data indicating the nodes and the edges of a dynamic graph;

estimate, for one or more nodes of the nodes, cliques of size less than or equal to a user specified or default clique size parameter;

store the estimated cliques in the clique variable;

identify, for cliques of size greater than or equal to the user specified or default clique size parameter, at most a single clique of a corresponding size;

store the identified single clique in the clique variable;

update and overwrite, in real time, the adjacency and clique variables in response to an addition or deletion of a node or edge in the dynamic graph; and return, for each node, the largest maximal cliques in the clique variable.

2. The device of claim 1, wherein each of the cliques of size less than or equal to the user specified or default clique size parameter and the cliques of size greater than or equal to the user specified or default clique size parameter includes nodes that each include an edge therebetween.

3. The device of claim 1, wherein storing the estimated cliques in the clique variable includes storing, for each node in a clique, the clique, in the clique variable, of the node.

4. The device of claim 1, wherein the clique variable is sub-indexed by clique size and includes entries indicating nodes in a clique for each clique size associated with the node.

5. The device of claim 1, wherein the dynamic graph data indicates updates, additions, or deletions to the nodes and edges of the dynamic graph.

6. A computer-implemented method for determining an approximation of a set of largest maximal cliques connected to each node, entities represented by nodes and pairwise relation represented by edges, the method comprising:

initializing an adjacency variable indexed by node and includes entries, for each node, indicating which other nodes of the nodes are directly connected to the node by an edge;

initializing a clique variable indexed by node and sub-indexed by clique size, storing, for each node, cliques of which the node is a member;

receiving dynamic graph data indicating the nodes and the edges of a dynamic graph;

estimating, for one or more nodes of the nodes, cliques of size less than or equal to a user specified or default clique size parameter;

storing the estimated cliques in the clique variable;

identifying, for cliques of size greater than or equal to the user specified or default clique size parameter, at most a single clique of a corresponding size;

storing the identified single clique in the clique variable;

updating and overwriting, in real time, the adjacency and clique variables in response to an addition or deletion of a node or edge in the dynamic graph; and returning, for each node, the largest maximal cliques in the clique variable.

7. The method of claim 6, wherein each of the cliques of size less than or equal to the user specified or default clique size parameter and the cliques of size greater than or equal to the user specified or default clique size parameter includes nodes that each include an edge therebetween.

8. The method of claim 6, wherein storing the estimated cliques in the clique variable includes storing, for each node in a clique, the clique, in the clique variable, of the node.

9. The method of claim 6, wherein the clique variable is sub-indexed by clique size and includes entries indicating cliques containing nodes, where the cliques are of that clique size and associated with the node.

10. The method of claim 6, wherein the dynamic graph data indicates updates, additions, or deletions to the nodes and edges of the dynamic graph.

11. A non-transitory machine-readable medium including instructions that, when executed by a machine, cause the machine to perform operations for determining an approximation of a set of largest maximal cliques connected to each node, entities represented by nodes and pairwise relation represented by edges, the operations comprising:

initializing an adjacency variable indexed by node and includes entries, for each node, indicating which other nodes of the nodes are directly connected to the node by an edge;

initializing a clique variable indexed by node and sub-indexed by clique size, storing, for each node, cliques of which the node is a member;

receiving dynamic graph data indicating the nodes and the edges of a dynamic graph;

estimating, for one or more nodes of the nodes, cliques of size less than or equal to a user specified or default clique size parameter;

storing the estimated cliques in the clique variable;

identifying, for cliques of size greater than or equal to the user specified or default clique size parameter, at most a single clique of a corresponding size;

storing the identified single clique in the clique variable;

updating and overwriting, in real time, the adjacency and clique variables in response to an addition or deletion of a node or edge in the dynamic graph; and returning, for each node, the largest maximal cliques in the clique variable.

12. The non-transitory machine-readable medium of claim 11, wherein each of the cliques of size less than or equal to the user specified or default clique size parameter and the cliques of size greater than or equal to the user specified or default clique size parameter includes nodes that each include an edge therebetween.

13. The non-transitory machine-readable medium of claim 11, wherein storing the estimated cliques in the clique variable includes storing, for each node in a clique, the clique, in the clique variable, of the node.

* * * * *